3,142,713
PROCESS FOR HYDROISOMERIZATION OF HYDROCARBONS INCLUDING THE OXIDATIVE REGENERATION OF CATALYST EMPLOYED THEREIN
Norman L. Carr and Oral L. Beber, Crystal Lake, and Vincent Brozowski, Mundelein, Ill., assignors to The Pure Oil Company, Chicago, Ill., a corporation of Ohio
Filed Dec. 16, 1958, Ser. No. 780,859
8 Claims. (Cl. 260—683.65)

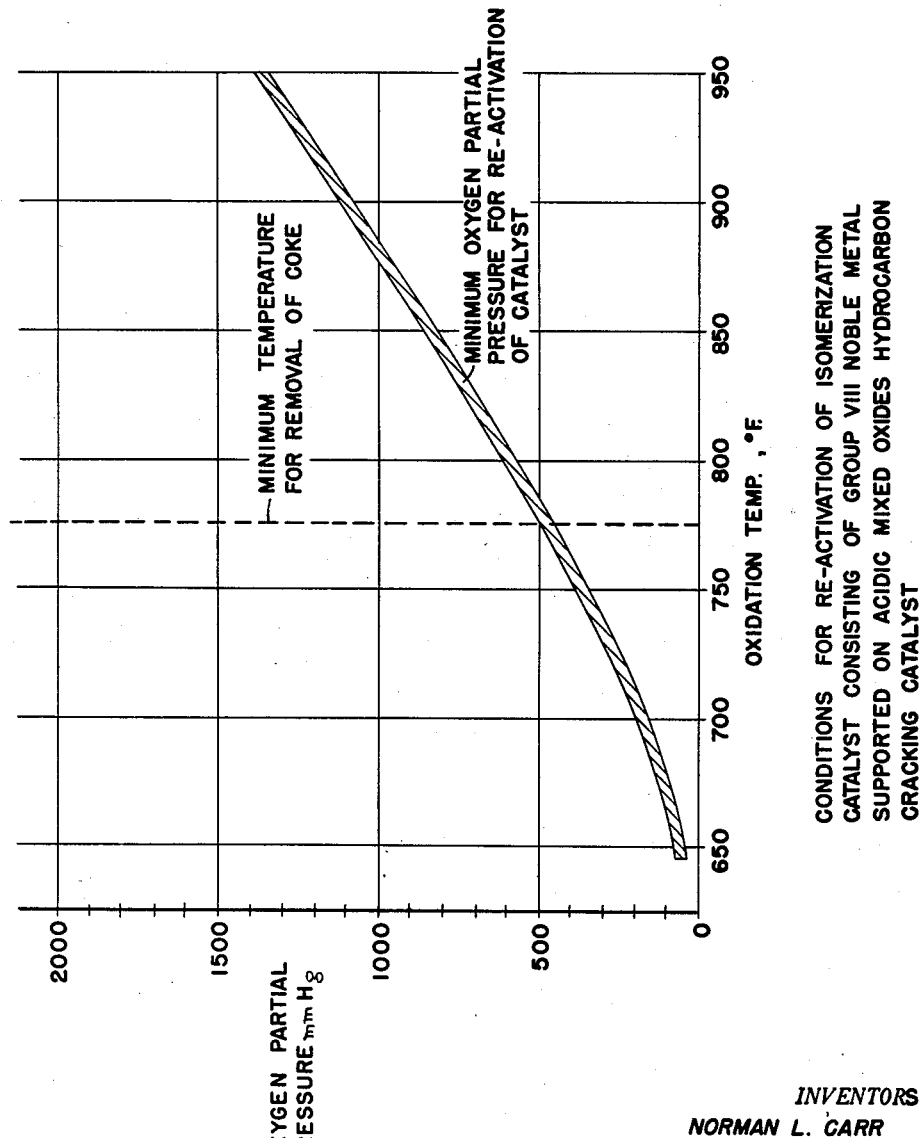

This invention is directed to a new and improved process for the regeneration and reactivation of certain noble-metal-containing isomerization catalysts. More particularly, this process is concerned with the regeneration and reactivation of isomerization catalysts, consisting of a small amount of a Group VIII noble metal on a mixed-oxides, hydrocarbon-cracking catalyst as support, by oxidation of the catalyst at a predetermined elevated temperature using a predetermined oxygen pressure, followed by reduction of the oxidized catalyst with hydrogen.

It has been found that normal $C_5$–$C_7$ alkanes can be converted into the corresponding branched-chain isomers, to form fuel blending stocks of very high octane number, by a process of contacting the n-paraffins and hydrogen at a temperature of about 600°–775° F. with a catalyst consisting of a small amount of a Group VIII noble metal on an acidic, mixed-oxides, hydrocarbon-cracking catalyst as support. Processes of isomerization of n-paraffins using such catalysts produce conversions approaching equilibrium (e.g., 20–60%), and isoparaffin products at selectivities of the order of 95–100%. In the operation of such isomerization processes, however, the isomerization catalyst may become fouled and deactivated after extended periods of use. In such an event, the activity of the catalyst may decline to a very small fraction of its initial value, thus reducing both the conversion of the n-paraffin feed stock and the selectivity for formation of isoparaffin products. Previously, processes have been devised for the regeneration of deactivated or fouled isomerization catalysts by oxidizing the catalyst in oxygen, air, or other oxygen-containing gas, to remove impurities, such as coke, sulfides, water, etc., followed by reduction of the oxidized catalyst with hydrogen at elevated temperatures. It has been found, however, that a number of problems are encountered in the regeneration of isomerization catalysts which have proved quite difficult to solve. One of the main problems is that certain oxidation conditions cause isomerization catalysts, consisting of a Group VIII noble metal on a hydrocarbon-cracking catalyst support, to lose activity, either in a regeneration or activation procedure. There has arisen considerable difficulty in the isomerization of n-paraffins using such catalysts because of the tendency of the promoted catalysts to lose activity upon "regeneration," thus reducing substantially the effectiveness of the catalyst for such an isomerization process. The problem of poor activity of catalysts so treated has been overcome by proper control of the reactivation of the catalysts in the oxidation and reduction steps. Thus, by avoiding very high oxidation temperatures, by using high oxygen pressure, and by using a very small amount of water vapor in the air or oxygen, and in the hydrogen in the reduction step, catalysts have been regenerated and reactivated to substantially their virgin level of activity. While catalysts have been reactivated to their virgin level of activity using a sequential process of oxidation and reduction of the spent catalyst, it has been found that the catalysts can also be conditioned to produce a very high selectivity for formation of the desired isoparaffins.

When the catalyst is badly coked, it is necessary to subject it to more severe oxidation to remove the coke. In some cases, the catalyst can be reactivated after oxidation of the coke therefrom to produce a catalyst of high activity. At other times, the oxidation of the catalyst for removal of the coke has resulted in severe deactivation of the catalyst.

It is therefore one object of this invention to provide a new and improved process for the reactivation and regeneration of isomerization catalysts, whether fouled with coke or coke-free, to a level of activity and selectivity essentially equal to the activity and selectivity of an activated, virgin, isomerization catalyst.

Another object of this invention is to provide an improved process for the simultaneous removal of coke from and reactivation of an isomerization catalyst.

A feature of this invention is the provision of an improved process for the reactivation of isomerization catalysts in which the catalyst is heated in an oxygen-containing atmosphere to a temperature in the range from about 650°–950° F. at an oxygen partial pressure in excess of the minimum pressure line in the accompanying graph in the drawings.

Another feature of this invention is the provision of a process for the simultaneous removal of coke from and reactivation of an isomerization catalyst in which the catalyst is heated to a temperature of about 775°–950° F. in an oxygen-containing atmosphere at an oxygen partial pressure in excess of the minimum pressure line in the accompanying graph in the drawings, followed by reduction of the oxidized catalyst with hydrogen at an elevated temperature and pressure.

Other objects and features of this invention will become apparent from time to time throughout the specification and claims as hereinafter related.

This invention is based upon our discovery that isomerization catalysts as defined herein can be reactivated or regenerated by heating in an oxygen-containing atmosphere to a temperature in the range from about 650° F. to 950° F. at an oxygen partial pressure in excess of the minimum pressure line in the graph which is shown in the figure of the drawings. When the catalyst is free from coke, the oxidation temperature may vary from 650° to 950° F., as long as the partial pressure of oxygen used is higher than the minimum pressure line in the graph shown in the drawings. When the catalyst is fouled with coke, it is necessary to heat the catalyst to a temperature of at least 775° F. for removal of coke therefrom. At lower temperatures, a coke-fouled catalyst is not regenerated or reactivated because the coke is not removed. At temperatures in excess of 775° F. coke is removed from the catalyst regardless of the partial pressure of oxygen. However, the catalyst is reactivated and regenerated only if the partial pressure of oxygen is in excess of the minimum pressure line shown on the graph in the drawings. At lower oxygen partial pressure the catalyst may actually be deactivated while coke is being removed. When the catalyst has been oxidized for a time sufficient to remove the coke or other impurities and to convert the oxidizable constituents into oxidized form, usually a period of at least two hours, the catalyst is then reduced with hydrogen and thus converted to a highly active form. The reduction of the oxidized catalyst with hydrogen is carried out at a temperature of 750°–950° F. using hydrogen at any suitable pressure from atmospheric to superatmospheric pressures up to 2000 p.s.i.g., or higher. Preferably, the reduction step is carried out using hydrogen at a pressure of about 400–600 p.s.i.g. at a temperature of 850°–950° F., the hydrogen containing a very small amount of water vapor, e.g., a partial pressure of about 2–6 mm. Hg. The final step of reducing the oxidized catalyst is preferably carried out in the manner just described but is not limited to these conditions. For example, the reduction may also be conducted in the manner described in copending patent applications, Serial No. 694,586, filed November 5, 1957, Patent No. 2,943,127, Serial No. 704,615, filed December 23, 1957, Patent No. 3,047,491, Serial No. 699,622, filed November 29, 1957, Patent No. 3,108,974, Serial No. 704,819, filed December 23, 1957, Patent No. 3,013,980, and Serial No. 619,611, filed October 31, 1956, Patent No. 2,968,631.

Another important result found in applying the process of this invention is the effect of the treatments on hydrocracking the principal side-reaction encountered in isomerization processes of the kind described. We have found that the oxidation should be carried out at the lowest temperature in the 650°–950° F. range which is compatible with optimum activation. We found, for example, that oxidation at 650° F. produced a catalyst with significantly less hydrocracking activity than a catalyst oxidized at 800° F. The magnitude of the improvement was 0.3% w. yield unit.

Catalysts which are susceptible to treatment in accordance with this invention are isomerization catalysts consisting of a small amount of a hydrogenation agent supported on a refractory, acidic, mixed-oxides hydrocarbon-cracking catalyst. In particular, the process is applicable to catalysts consisting of 0.01–1.0% w. of a Group VIII noble metal, e.g., palladium, platinum, rhodium, iridium, etc., or mixtures thereof, supported on refractory, acidic, mixed-oxides, such as silica-alumina, silica-zirconia, silica-titania, silica-boria, silica-alumina-zirconia, etc. Silica-alumina, containing 50–90% silica, composited to evince acidic properties and hydrocarbon-cracking activity, is one of the best supports for the catalysts treated in accordance with this invention. It has also been found that catalysts comprising 0.01–1.0% w. of a Group VIII noble metal on a refractory, acidic, mixed-oxides support are increased substantially in isomerization activity when prepared with 0.05–5.0% combined fluorine therein. The fluorine is added to the catalyst by treating the support with a solution of HF, $NH_4F$, or fluorinated $C_2$–$C_6$ alkanoic acids, or by precipitating $AlF_3$ or $ZrF_4$ therein, or by treating the catalyst support with gaseous fluorinated organic compounds, such as fluorinated $C_2$–$C_6$ alkanoic acids, fluorinated $C_1$–$C_6$ alkanes, fluorinated $C_1$–$C_6$ alkanols, or fluorinated $C_1$–$C_6$ aliphatic ethers, at elevated temperatures, e.g., 500°–1000° F. The fluorine-containing, Group VIII noble metal-promoted isomerization catalysts respond very favorably to the process of reactivation and regeneration which constitutes this invention.

Catalysts which were used in determining the conditions required for uniform maximum catalyst activity on reactivation and regeneration were prepared substantially as described in Folkins et al., patent application Serial No. 691,996, filed October 23, 1957. A silica-alumina gel, or other acidic, mixed-oxides gel, is prepared utilizing conventional techniques for the preparation of mixed-oxides, hydrocarbon-cracking catalysts. The mixed-oxides gel is impregnated with a solution of a metal salt of a Group VIII noble metal and, in some cases, given a further treatment to include a fluorine-containing compound. The compound may be added in the form of ammonium fluoride, hydrofluoric acid, or fluorinated $C_2$–$C_6$ alkanoic acids, preferably with the solution of the Group VIII noble metal salt. Alternatively, aluminum fluoride or zirconium fluoride may be precipitated in the gel, or the catalyst support may be treated with fluorinated $C_1$–$C_6$ alkanes, fluorinated $C_1$–$C_6$ alkanols, or fluorinated $C_1$–$C_6$ aliphatic ethers. The fluorinated alkanes, alkanols, and ethers may also be added by subjecting the catalyst to the vapors of these compounds at elevated temperatures. The catalyst containing the Group VIII noble metal salt, and which may include combined fluorine, is dried and formed into pellets ⅛″ x ⅛″. The catalyst pellets are then reduced with hydrogen at a temperature of about 975° F. These catalysts are used in the isomerization of normal pentane and hexane to the corresponding isomers by passing the normal hydrocarbons together with hydrogen over the catalyst at a temperature in the range from about 650° to 775° F., a pressure within the range of about 100–1000 p.s.i.g., and a hydrogen/hydrocarbon mol ratio within the range from about 0.5–5. Where the isoparaffin products are removed from the reactor effluent of the isomerization process, and the normal paraffin recycled, it is possible to operate the process to completely convert the n-paraffins. As space velocities are increased, the yields per pass diminish. When the catalyst has become deactivated, either due to coking or to the effect of water or other impurities, it is necessary to regenerate and reactivate the catalyst.

In our experiments, a large number of catalysts of varying composition were prepared and rendered inactive in a manner simulating the inactivation of a catalyst after extended use. Samples of the inactive catalysts were then subjected to oxidation with oxygen at varying temperatures, pressures, and water vapor content, for different periods of time, followed by reduction with hydrogen at varying temperatures, pressures, and water vapor content for varying periods of time. As was previously indicated, the regeneration of catalysts by certain sequential oxidation and reduction has been used before, but has produced very erratic results with respect to the activity level of the reactivated or regenerated catalyst.

After catalysts were reactivated and regenerated using various conditions of temperature, pressure, time, and water vapor content of the oxygen-containing gas, or the hydrogen used in the final reduction, the reactivated or regenerated catalyst was tested to determine its activity as an isomerization catalyst in the isomerization of normal paraffin hydrocarbons. Each of the catalyst samples which were tested in the development of this invention was used to isomerize n-pentane under preselected operating conditions. In testing the catalyst, n-pentane (desulfurized, water-washed, and dried) and pure dry hydrogen, at a hydrogen/hydrocarbon mol ratio of 2.3 and a pressure of 600 p.s.i.g., were fed through a reactor containing the catalyst at a liquid volume hourly space velocity (LVHSV) of 25.0, the reactor being maintained at 765° F. The run time for testing each catalyst was sufficient to establish reliable feed and product rates, normally being from 4 to 6 hours. From each of these runs, the isopentane yield was determined and from it the isomerization rate constant was calculated. The isomerization of n-pentane to isopentane is a first order reversible reaction. The first order rate constant for this reaction using pure feed is defined as $$k = (LVHSV) \ln \left( \frac{1}{1 - x/0.62} \right)$$

where $x$ is the fractional yield of isopentane. When a catalyst has become deactivated or fouled after a period of use, the rate constant $k$ may decline to a value less than 1.

In our experiments, the problem was to determine the effects of various factors on the regeneration of an isomerization catalyst, with special emphasis upon catalysts consisting of palladium and fluorine on a hydrocarbon-cracking catalyst support. An experiment plan was devised for a sixteen-run program for evaluating the effect of (A) oxidation at 650° F. and 800° F., (B) oxygen partial pressure during oxidation, 35 mm. and 500 mm. Hg, (C) water partial pressure during oxidation, 0 mm. and 6 mm.

Hg, and (D) water partial pressure during final reduction at 850° F. or 950° F. and 600 p.s.i.g., 1–2 mm. and 6 mm. Hg. The factorial design used followed the method of Yates, see Design and Analysis of Industrial Experiments, O. L. Davies, Oliver and Boyd (1954), p. 264. The significance of effects was evaluated by variance analysis.

The catalyst used in the sixteen-run program consisted of 0.35% w. Pd on 75/25 silica-alumina containing 2% combined fluorine. The catalyst was in the form of 1/8" x 1/8" pellets having a bulk density of 0.628 g./ml. The catalyst was prepared by impregnation of the silica-alumina support with HF and chloropalladic acid followed by drying, reduction with hydrogen at 975° F. for sixteen hours, and oxidation with air at 775° F. Separate ten gram samples of the catalyst were prepared for each run. Each catalyst sample was separately charged to the reactor and contacted with pure dry hydrogen at atmospheric pressure, at a flow rate of 2–3 c.f.h., at 920° F. for two hours just prior to the commencement of the run. The catalyst sample was purged with dry nitrogen, at the oxidation temperature selected for the run to remove hydrogen. Then, air containing oxygen at the desired partial pressure was passed over the catalyst at the selected temperature for five hours at a flow rate of 4 c.f.h. Following oxidation, the reactor was purged with dry nitrogen. Dry hydrogen, at 650° F., was admitted to the reactor at atmospheric pressure and circulated therethrough until the water content of the reactor effluent was 100 p.p.m. The pressure was then adjusted with dry hydrogen to 600 p.s.i.g. and the catalyst reduced for eight hours with dry or wet hydrogen at 850° or 950° F. as selected for the particular run.

Catalysts treated in the manner just described were evaluated in the isomerization of n-pentane under the standard conditions described above and the rate constant $k$ determined for each catalyst. From a statistical analysis of the rate constants for the catalysts treated in the sixteen-run program calculations were made which enabled us to define certain necessary conditions for activation and regeneration of catalysts. The rate constant was 4.26 units lower when the higher oxygen partial pressure (500 mm.) was used, and 2.32 units lower when moist oxygen was used. The effect of water partial pressure in the hydrogen at high hydrogen pressure and 1–6 mm. water vapor pressure was not statistically significant. There was a slight improvement in the rate constant when the reduction was carried out at the higher temperature (950° F.), which was not statistically significant. The optimum conditions indicated by the sixteen runs were (A) oxidation temperature, 650° F., (B) oxygen partial pressure, 500 mm., (C) partial pressure of water in oxidation step, less than 6 mm., (D) reduction with hydrogen at 950° F., at 600 p.s.i.g. with 0–6 mm. water vapor present, or at 850° F. with 5–10 mm. water vapor present.

The following non-limiting examples are illustrative of the scope of this invention and develop in more detail the conditions required for proper regeneration and reactivation of isomerization catalysts.

EXAMPLE I

In a series of experiments, catalyst samples consisting of 0.35% w. palladium on 75/25 silica-alumina (i.e., 75% silica, 25% alumina composite), containing 2% combined fluorine were subject to oxidation with oxygen at varying partial pressures, and temperatures, followed by reduction with dry hydrogen at 850°–950° F. Oxidation of the inactive catalysts was carried out over a period of five hours, while the reduction (with hydrogen) of the oxidized catalyst was carried out at 600 p.s.i.g. over a period of eight hours. After each of the catalyst samples had been oxidized at the selected temperature and pressure, and reduced, it was tested as previously described to determine its isomerization rate constant $k$ under the selected test conditions previously described. In Table I, there are shown the isomerization rate constants $k$ for various catalysts of this composition which were treated at the indicated temperature and oxygen partial pressure. It should be noted that the oxidation was carried out with air under pressure (or diluted with nitrogen for the 35 mm. and 100 mm. pressure), but pure oxygen may be used and produces the same results at the indicated pressures. Likewise, pure oxygen diluted with any of the noble gases, or other inert gases which are completely unreactive with the catalyst, may be used.

Table I

[Effect of temperature and oxygen partial pressure on regeneration and reactivation of a 0.35% w. Pd on 75/25 silica-alumina catalyst containing 2% combined fluorine, showing isomerization rate constant $k$ for the catalyst after treatment]

| Oxygen partial pressure, mm. Hg | Temperature, °F. | | | | |
|---|---|---|---|---|---|
| | 650 | 725 | 800 | 875 | 950 |
| 35 | 13 | 11 | 9 | | |
| 100 | 15 | | | | |
| 150 | 15 | | 10.6 | | |
| 300 | | 16 | | | |
| 500 | 16 | | 11.5 | 9 | |
| 600 | 16 | | 16 | | |
| 850 | | 16 | 16 | 14.7 | |
| 900 | 16 | 16 | 16 | 15 | 9 |
| 1,300 | | | | 16 | 15 |
| 1,500 | 16 | 16 | 16 | | 16 |

From this table, it is seen that a maximum satisfactory activation of the catalyst, as indicated by a rate constant $k$ of about 15 or more, is obtained only when the oxidation step is carried out at a temperature of 650°–950° F. and an oxygen partial pressure greater than the minimum oxygen partial pressure line shown in the graph in the accompanying drawings.

EXAMPLE II

When an isomerization catalyst is fouled with coke, it is necessary to burn off the coke from the catalyst in the initial step of regeneration of the catalyst. We have found that by using temperatures which are sufficiently high to burn the coke off the catalyst, and oxygen pressures above the minimum oxygen pressure required for reactivation of the catalyst, it is possible to remove the coke from a fouled catalyst and regenerate and reactivate the catalyst simultaneously. In Table II, there are shown the isomerization rate constants, $k$, for catalysts which were fouled with 1.6% w. coke and which were treated by heating the catalyst in a mixture of oxygen and an inert gas, viz., air, at various partial pressures of oxygen and various temperatures. The oxidation time was 2, 5, 8, and 15 hours in a planned program, and the oxidized catalysts were reduced with pure hydrogen (containing a partial pressure of water vapor of 2–4 mm.) for a period of eight hours at 850° F. at a pressure of about 600 p.s.i.g.

Table II

[Effect of temperature and oxygen partial pressure on regeneration and reactivation of 0.35% w. Pd on 75/25 silica-alumina containing 2% combined fluorine and fouled with 1.6% w. coke, showing isomerization rate constant $k$ for catalyst after treatment]

| Oxygen partial pressure, mm. Hg | Temperature, °F | | | | | | |
|---|---|---|---|---|---|---|---|
| | 650 | 725 | 750 | 775 | 800 | 875 | 950 |
| 100 | Less than 1[1]. | Less than 1[1]. | Less than 1[1]. | 6 | 6 | | |
| 150 | do | do | do | | 10.6 | | |
| 225 | | | | | | 12.1 | |
| 300 | Less than 1. | Less than 1. | Less than 1. | | 11 | | |
| 500 | do | do | do | 16 | 11.5 | | |
| 600 | do | do | do | 16 | 16.0 | | |
| 850 | do | do | do | 16 | 16.4 | 14.7 | |
| 900 | do | do | do | 16 | | 15 | 9 |
| 1,300 | do | do | do | 16 | | 16 | 16 |
| 1,500 | do | do | do | | 16 | 16 | 16 |

[1] At temperatures less than 775° F. coke is not removed and catalyst remains deactivated.

From the data set forth in Table II, it is seen that at temperatures less than 775° F. coke is not removed from the catalyst regardless of the pressure of oxygen. At temperatures less than 775° F., the catalyst is not reactivated, the coke is not removed, and the rate constant $k$ for the catalyst remains at a value less than 1. At temperatures of 775° F., 800° F., 875° F., and 950° F., the coke is removed from the catalyst and the catalyst is reactivated to a maximum activity when the oxygen partial pressure is above the minimum pressure line in the drawing. From these data, it is seen that regeneration of a coke-fouled catalyst requires an oxidation temperature of about 775°–950° F. and an oxygen partial pressure above the minimum pressure line in the drawing. If the oxidation temperature is in the range of about 775°–950° F. but the oxygen partial pressure is less than the minimum pressure line in the drawing, coke is removed but the catalyst is deactivated.

EXAMPLE III

In another series of experiments, the composition of the catalyst was varied by changing the catalyst support to an 87/13 silica-alumina containing 0.48% w. palladium, wtihout any additional promoter (e.g., combined fluorine) present. Samples of these catalysts which were deactivated without deposition of coke thereon were given the same treatment as the catalysts in Example I at various temperatures from 650°–950° F. and various oxygen partial pressures from 35 to 1500 mm., and reduced with hydrogen as in Example I. The isomerization rate constants for catalysts of this composition which were activated in this manner are shown in Table III.

Table III

[Effect of temperature and oxygen partial pressure on regeneration and reactivation of 0.48% w. Pd on 87/13 silica-alumina catalyst, showing isomerization rate constant $k$ for catalyst after treatment]

| Oxygen partial pressure, mm. Hg | Temperature °F. | | | | |
|---|---|---|---|---|---|
| | 650 | 725 | 800 | 875 | 950 |
| 35 | 5 | 4 | 3 | | |
| 100 | 6 | | 4 | | |
| 150 | 6 | | 4 | | |
| 300 | | 6 | | | |
| 500 | 6 | | 4 | 3 | |
| 600 | | | 6 | | |
| 850 | | 6 | 6 | 6 | |
| 900 | 6 | | 6 | 6 | 3 |
| 1,300 | | | | 6 | 6 |
| 1,500 | 6 | | 6 | | 6 |

From the data in this table, it is seen that this catalyst, while containing a higher concentration of palladium, is less active than the catalyst which contains combined fluorine. Nevertheless, these catalysts were regenerated to maximum (i.e., substantially virgin activity) catalytic activity under the same conditions used to reactivate the catalysts of Example I. At temperatures from 650°–950° F., these catalysts as regenerated to a maximum activity level only when using an oxygen partial pressure in excess of the minimum pressure line in the accompanying drawing.

EXAMPLE IV

In another series of experiments, the effect of temperature and oxygen partial pressure was determined for the regeneration and reactivation of a catalyst of still different composition. This catalyst consisted of 0.4% w. palladium on 75/25 silica-zirconia, containing 1% combined fluorine (added to the catalyst support prior to initial activation, as trifluoroacetic acid). This catalyst had a maximum (i.e., substantially virgin activity) activity which was somewhat lower than the catalysts of Example I. Samples of this catalyst were subjected to sequential oxidation and reduction under the same conditions as Examples I and III, using oxidation temperatures from 650°–950° F. and oxygen partial pressures of 100 to 1300 mm. The isomerization rate constants $k$ for samples of this catalyst treated at these various temperatures and oxygen pressures are set forth in Table IV.

Table IV

[Effect of temperature and oxygen partial pressure on regeneration and reactivation of 0.40% w. Pd on 75/25 silica-zirconia catalyst containing 1% combined fluorine, showing isomerization rate constant for catalyst after treatment]

| Oxygen partial pressure, mm. Hg | Temperature, ° F. | | | | |
|---|---|---|---|---|---|
| | 650 | 725 | 800 | 875 | 950 |
| 35 | 8 | 7 | 6 | | |
| 100 | 9.5 | | | | |
| 150 | 9.5 | | 7 | | |
| 300 | | 10 | | | |
| 500 | 10 | | 7 | 6 | |
| 600 | 10 | 10 | 10 | | |
| 850 | 10 | | | 10 | |
| 900 | | | 10 | 10 | 6 |
| 1,300 | | | | | 10 |

From the data set forth in Table IV, it is seen that this catalyst composition requires substantially the same conditions for reactivation to a maximum activity level as the other catalysts. Thus, this catalyst is reactivated to a maximum activity level when oxidized at a temperature in the range from 650°–950° F. and an oxygen partial pressure above the minimum pressure line shown in the drawing, following by hydrogen reduction.

EXAMPLE V

In another series of experiments, different catalyst compositions were prepared using a variety of refractory, mixed-oxides supports and a variety of Group VIII noble metals deposited thereon, together with other promoters, principally combined fluorine. These catalysts were prepared in the same manner as the palladium catalysts by preparing the mixed-oxides gel indicated as the catalyst support, impregnating the support with a solution of a salt of the metal promoter, and where combined fluorine was used, it was usually added with the solution of the salt of the metal promoter. Thus, the first two catalysts and the fifth and sixth catalysts in Table V were impregnated with aqueous solutions of salts of the metal promoter containing the indicated fluorine-containing compound. The catalyst was dried and activated for initial use by reduction with hydrogen at about 975° F. These catalysts were tested as in the other examples. The last two catalysts in Table V contained fluorine in the form of aluminum fluoride or zirconium fluoride which was added by impregnating the support with a solution of an aluminum or zirconium salt and precipitating the fluoride salt in the support. The seventh catalyst in Table V was provided with added fluorine by introducing 20 parts per million of dichlorodifluoromethane in the oxygen used in oxidizing the catalyst. These catalysts, which are set forth in Table V, were rendered inactive without deposition of coke thereon, treated by oxidation at various temperatures and pressures, and then by reduction with hydrogen at about 850°–950° F. Because of the variety of catalyst compositions involved and the variation in isomerization rate constants of the virgin catalysts, the catalysts are compared in Table V in relative terms, full (substantially virgin) activity or low (substantially inactive) activity, for treatments at certain selected temperatures and oxygen pressures to indicate that these catalyst compositions may be reactivated and regenerated in the same manner as the catalysts in the preceding examples, for which a more exhaustive presentation of the effect of temperature and oxygen pressure has been made.

Table V

[Effect of temperature and oxygen partial pressure on regeneration and reactivation of different isomerization catalyst compositions, showing comparative reaction rate constants for catalysts after treatment]

| Catalyst Support | Metal Promoter | Other Promoter | Temperature | | | | |
|---|---|---|---|---|---|---|---|
| | | | 650° F., 100 mm. $O_2$ | 725° F., 100 mm. $O_2$ | 725° F., 300 mm. $O_2$ | 800° F., 500 mm. $O_2$ | 800° F., 850 mm. $O_2$ |
| 75/25 silica-alumina | 0.35% Pt | 1% F (as $NH_4F$) [1] | Full Activity. | Low Activity. | Full Activity. | Low Activity. | Full Activity. |
| Do | 0.35% Rh | do | do | do | do | do | Do. |
| 87/13 silica-alumina | 0.50% Ir | None | do | do | do | do | Do. |
| Do | 0.30% Pd, 0.05% Rh | do | do | do | do | do | Do. |
| 87/13 silica-zirconia | 0.35% Pt | 1% F (as $CF_3COOH$) [1] | do | do | do | do | Do. |
| 70/20/10 silica-alumina silica-zirconia | 0.48% Pd | do | do | do | do | do | Do. |
| 75/25 silica-alumina | 0.48% Pd | 20 p.p.m. $CCl_2F_2$ [1] in oxygen. | do | do | do | do | Do. |
| Do | do | 1% F (as $AlF_3$) [1] | do | do | do | do | Do. |
| Do | do | 1% F (as $ZrF_4$) [1] | do | do | do | do | Do. |

[1] Preparational fluorine compound.

From the data set forth in Table V, it is seen that each of the catalysts was activated to a high level of isomerization activity, as indicated by a high isomerization rate constant, when oxidized at a temperature of 650°–950° F. and an oxygen partial pressure above the minimum pressure line shown in the accompanying drawing.

In the oxidation of the various catalysts the time of oxidation is not critical, although there is an interrelation of oxidation time and temperature and pressure. Thus, the minimum oxidation time is about two hours and, when the temperature and pressure are in the proper range, the variation of time produces no significant changes in the catalyst. However, at lower temperatures and oxygen partial pressures the time required for oxidation is longer. Generally, any time in excess of two hours, e.g., 2–20 hrs., sufficient to oxidize the catalyst is sufficient. On the other hand, when the conditions of temperature and oxygen partial pressure are not in the desired range, increase in oxidation time (e.g., to 15 or 20 hrs.) results in more pronounced deactivation of the catalyst.

EXAMPLE VI

In another series of experiments, the effect of water vapor in the oxygen used was determined. Catalysts of the same composition used in Example I, which were free of coke, were treated at 650° and 800° F., respectively, at oxygen pressures of 500 and 600 mm., with water vapor pressures of 0 mm. and 6 mm., respectively. The isomerization rate constants for catalysts which were treated in this manner are shown in Table VI. These oxidized catalysts, of course, were reduced with hydrogen in the same manner as in Example I. The results show average differences based on eight tests with water and eight without water.

Table VII

[Effect of water in the oxidation step in reactivation and regeneration of catalyst consisting of 0.35% w. Pd on 75/25 silica-alumina containing 2% combined fluorine (added as HF), showing isomerization rate constant $k$ after treatment of catalyst]

| Temp., ° F. | Oxidation Partial Pressure | | |
|---|---|---|---|
| | Oxygen, mm. Hg | Water Vapor, mm. Hg | |
| | | 0 | 6 |
| 650 | 500 | 16 | 13 |
| 800 | 600 | 16 | 13 |

From the data in this table, it is seen that the oxygen-containing gas, e.g., air or mixture of oxygen with inert gases, must be substantially anhydrous, since a partial pressure as low as 6 mm. of water vapor in 500–600 mm. of oxygen results in a 20% loss in activity of the catalyst.

EXAMPLE VII

When the reactivation and regeneration of catalysts of the composition used in Example I is repeated at the conditions of temperature and pressure used in Example I, substituting pure oxygen at the indicated pressures for air, the activity level of the regenerated catalysts is the same as that indicated for the various examples in Table I. Similarly, when a mixture of oxygen and helium is substituted for air as the oxidizing medium in the various examples set forth in Table I, the reaction rate constants $k$ for the various catalysts are the same as when air was used in the oxidant.

EXAMPLE VIII

In another series of experiments, the conditions of the reduction step were varied to determine any critical requirements for this step in the regeneration and reactivation of isomerization catalysts. A study was made of the effect of duration of the reduction step, temperature, hydrogen pressure, and water vapor content of the hydrogen gas. From these experiments, it has been found that the duration of the hydrogen reduction step is not critical, and may vary from 2 to 20 hours, a period of about eight hours being preferred. The hydrogen pressure required for the reduction step is not critical although the use of atmospheric pressure or other low pressures increases substantially the time required for the reduction of the catalyst. The hydrogen pressure used may vary from 0 to 2000 p.s.i.g. or higher, but is preferably about 400–600 p.s.i.g. The reduction temperature may vary from about 750° to 950° F. At the lower range of this temperature, the time required for complete reduction of the catalyst is increased considerably Because of the fact that water is generated in the reduction step, it is difficult to maintain the hydrogen within the catalyst bed completely anhydrous. However, the partial pressure of water vapor in the hydrogen gas feed should be kept below about 10 mm. Hg. A partial pressure of about 50 mm. of water vapor in the feed hydrogen produces a decline in catalytic activity of the isomerization catalyst and values in this range should be avoided. As a result of experiments made varying the conditions of the hydrogen reduction step, it has been concluded that the optimum conditions for reduction of the catalyst are: hydrogen pressure, 400–600 p.s.i.g.; water vapor, 2–6 mm. Hg; reduction temperature, 850°–950° F.; and reduction time about eight hours.

While we have described our invention fully and completely, with reference to and special emphasis upon several preferred embodiments, as required by the patent laws, we wish it understood that within the scope of the appended claims this invention may be practiced otherwise than as specifically described herein.

What is claimed is:

1. In a process for the hydroisomerization of $nC_5$–$C_6$ paraffin hydrocarbons in which hydrogen and hydrocarbon feed in a hydrogen/hydrocarbon mol ratio within the range from about 0.5 to 5 are passed at a temperature of about 650° to 775° F. and a pressure of about 100 to 1000 p.s.i.g. over a catalyst consisting essentially of 0.01–1.0% wt. of a Group VIII noble metal on an acidic refractory, mixed-oxides support selected from the group consisting of silica-alumina, silica-zirconia, silica-titania, silica-boria, and silica-alumina-zirconia, the improvement which comprises treating the catalyst after a period of use which has resulted in catalyst deactivation or degeneration to restore substantially virgin activity by heating the catalyst to a temperature of 650° to 950° F. for a period of at least two hours in a substantially anhydrous atmosphere selected from the group consisting of oxygen and mixtures of inert gases with oxygen at an oxygen partial pressure greater than the minimum pressure line in the drawing, without exposing said catalyst to oxygen at temperatures above 950° F., reducing the oxidized catalyst with substantially pure hydrogen at 750° to 950° F., and utilizing the catalyst for isomerization of $nC_5$–$C_6$ paraffin hydrocarbons under the recited isomerization conditions.

2. The process in accordance with claim 1 in which the catalyst support contains 0.05–5.0% combined fluorine.

3. A process in accordance with claim 1 in which the oxidized catalyst is reduced with hydrogen, containing water vapor at a partial pressure of 2–6 mm. Hg, at a pressure of 400–600 p.s.i.g., at a temperature of about 950° F.

4. A process in accordance with claim 1 in which the oxidized catalyst is reduced with hydrogen, containing water vapor at a partial pressure of 5–10 mm. Hg, at a pressure of 400–600 p.s.i.g., at a temperature of about 850° F.

5. A process in accordance with claim 1 in which the isomerization catalyst has become fouled with coke, said catalyst is regenerated and reactivated by heating to a temperature of 775° to 950° F. for a period of at least two hours in a substantially anhydrous atmosphere selected from the group consisting of oxygen and mixtures of inert gases with oxygen at an oxygen partial pressure greater than the minimum pressure line in the drawing and the catalyst is reduced with substantially pure hydrogen at 750° to 950° F.

6. A process in accordance with claim 5 in which the catalyst support contains 0.05–5% combined fluorine.

7. A process in accordance with claim 6 in which the oxidized catalyst is reduced with hydrogen, containing water vapor at a partial pressure of 2–6 mm. Hg, at a pressure of 400–600 p.s.i.g., at a temperature of about 950° F.

8. A process in accordance with claim 6 in which the oxidized catalyst is reduced with hydrogen, containing water vapor at a partial pressure of 5–10 mm. Hg, at a pressure of 400–600 p.s.i.g., at a temperature of about 850° F.

References Cited in the file of this patent

UNITED STATES PATENTS

| | | |
|---|---|---|
| 2,831,908 | Starnes et al. | Apr. 22, 1958 |
| 2,856,350 | Love | Oct. 14, 1958 |
| 2,879,232 | Malo et al. | Mar. 24, 1959 |
| 2,968,631 | Carr et al. | Jan. 17, 1961 |